(12) United States Patent
Lee et al.

(10) Patent No.: US 8,469,131 B2
(45) Date of Patent: Jun. 25, 2013

(54) WHEEL DRIVE VEHICLE AND WHEEL CONTACT SENSING METHOD OF THE SAME

(75) Inventors: Sang Hoon Lee, Daejeon (KR); Jin Wook Huh, Daejeon (KR); Sin Cheon Kang, Daejeon (KR); Yong Woon Park, Daejeon (KR)

(73) Assignee: Agency for Defense Development (KR)

( * ) Notice: Subject to any disclaimer, the term of this patent is extended or adjusted under 35 U.S.C. 154(b) by 0 days.

(21) Appl. No.: 13/522,601

(22) PCT Filed: Dec. 28, 2010

(86) PCT No.: PCT/KR2010/009439
§ 371 (c)(1),
(2), (4) Date: Jul. 17, 2012

(87) PCT Pub. No.: WO2012/091197
PCT Pub. Date: Jul. 5, 2012

(65) Prior Publication Data
US 2012/0285761 A1 Nov. 15, 2012

(51) Int. Cl.
*B62D 6/12* (2006.01)
(52) U.S. Cl.
USPC ............................................. 180/209

(58) Field of Classification Search
USPC ......................... 180/209, 210, 211, 212, 213
See application file for complete search history.

(56) References Cited

U.S. PATENT DOCUMENTS
7,950,675 B1 * 5/2011 Quenzi et al. .............. 280/6.157

FOREIGN PATENT DOCUMENTS
| JP | 7-081696 A | 3/1995 |
| JP | 9-142347 A | 6/1997 |
| JP | 2005-028971 A | 2/2005 |
| WO | WO 95/05303 A1 | 2/1995 |

OTHER PUBLICATIONS
International Search Report dated Sep. 30, 2011 issued in PCT/KR2010/009439.

* cited by examiner

*Primary Examiner* — Faye M. Fleming
(74) *Attorney, Agent, or Firm* — Scully, Scott, Murphy & Presser, P.C.

(57) ABSTRACT

Disclosed is a wheel drive vehicle including a main body having a rotatable arm and an arm driving unit for driving the arm, a wheel rotatably mounted to the arm, respectively, and a sensing unit for sensing a non-contact state of the wheel from a ground, wherein the sensing unit includes a spring, first and second sensors, and a controller.

14 Claims, 4 Drawing Sheets

WHEEL DRIVE VEHICLE AND WHEEL CONTACT SENSING METHOD OF THE SAME

TECHNICAL FIELD

The present invention relates to a wheel contact sensing method for sensing contact or non-contact of the wheel, and a wheel drive vehicle employing the same.

BACKGROUND ART

As high technologies are developed and advanced, various techniques are being applied to military fields. Especially, development of various sensors and computer hardware enables an unmanned combat system.

Developed countries have been concerned about development of military robots, especially, researches for an unmanned system in the field of national defense is undergoing in the United States in order to dispose unmanned vehicles in a future combat system. Active researches for the unmanned vehicles have been in progress even within the country and development of various unmanned systems is being conducted in the field of national defense.

Examining the course of technical development in the field of the unmanned system, unmanned vehicles may perform various missions, such as reconnaissance and attack, command and control, explosive detection/disposal and the like. Upon employing a wheel drive method in the unmanned vehicle, it is needed to detect (sense) whether or not the wheel contacts a ground in order for the unmanned vehicle to be unaffected by obstacles.

In general, a contact sensor (or pressure sensor) is attached between two objects to check contact or non-contact between the two objects. However, for example, if wheels of the unmanned vehicle occur severe friction at contact portions, the contact sensor may not be easy to be attached thereto.

Therefore, a new type of wheel contact sensing structure to be appropriate for the unmanned vehicle and a method thereof are required.

DISCLOSURE OF INVENTION

Technical Problem

Therefore, to address the above-mentioned problem, an aspect of the present disclosure is to provide a new type of wheel contact sensing structure and method, different from the related art, for detecting a wheel contact of a wheel drive vehicle.

Solution to Problem

To achieve these and other advantages and in accordance with the purpose of the present invention, as embodied and broadly described herein, there are provided a wheel drive vehicle including a main body having a rotatable arm and an arm driving unit for driving the arm, a wheel rotatably mounted to the arm, respectively, and a sensing unit for sensing a non-contact state of the wheel from a ground, wherein the sensing unit includes a spring installed between the arm driving unit and the arm, and extended or compressed in response to a relative rotary motion of the arm with respect to an output shaft of the arm driving unit, first and second sensors configured to detect rotation drive information related to the arm with respect to the main body and attitude information related to the main body, and a controller configured to measure a reference length of the spring in the non-contact state based upon at least one of the rotation drive information related to the arm and the attitude information related to the main body, and detect the non-contact state of the wheel based upon the measured length of the spring and the reference length thereof, and a wheel contact sensing method applied thereto.

To achieve these and other advantages and in accordance with the purpose of the present invention, as embodied and broadly described herein, there are provided a wheel drive vehicle including a main body having a rotatable arm and an arm driving unit for driving the arm, a wheel rotatably mounted to the arm, respectively, and a sensing unit for sensing a non-contact state of the wheel from a ground, wherein the sensing unit includes a spring installed between the arm driving unit and the arm, and extended or compressed in response to a relative rotary motion of the arm with respect to an output shaft of the arm driving unit, first and second sensors configured to detect rotation drive information related to the arm with respect to the main body and attitude information related to the main body, and a controller configured to measure a reference angle of the arm in the non-contact state based upon at least one of the rotation drive information related to the arm and the attitude information related to the main body, and detect the non-contact state of the wheel based upon the measured angle of the arm and the reference angle thereof, and a wheel contact sensing method applied thereto.

A wheel driving unit for rotating the wheel may be provided in each wheel, and the controller may run the wheel driving unit to rotate the wheel in the non-contact state. In addition, the controller may detect a contact state of the wheel with respect to the ground based upon a velocity change of the wheel, generated in response to the wheel contacting the ground.

Advantageous Effects of Invention

The present disclosure provides a new type of wheel contact sensing structure and method, capable of detecting a non-contact state of a wheel using a state of a spring and detecting a contact state of the wheel using a change in a rotation (angular) velocity of the wheel.

BEST MODE FOR CARRYING OUT THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a wheel drive vehicle and a wheel contact sensing method of the same according to an embodiment, with reference to the accompanying drawings.

Figure 1:
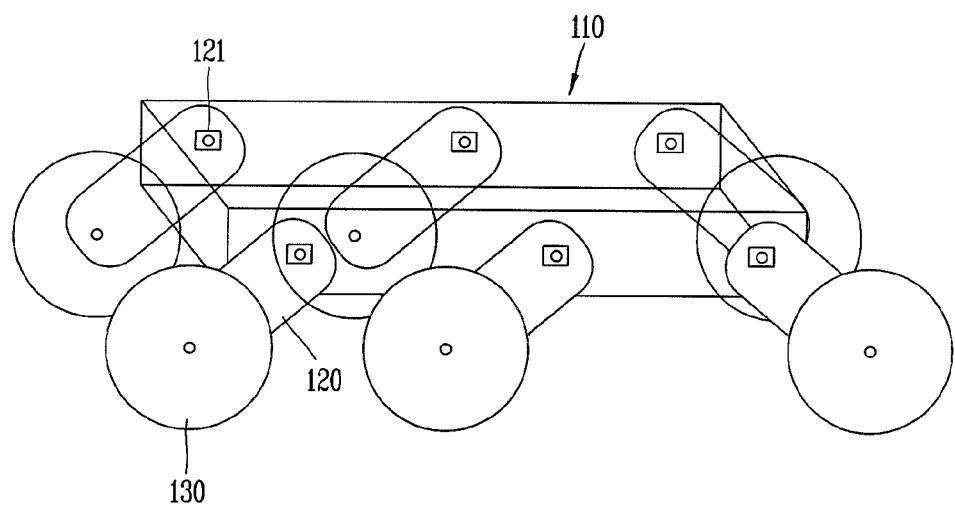
FIG. 1 is a perspective view of a wheel drive vehicle in accordance with one exemplary embodiment.
Figure 2:
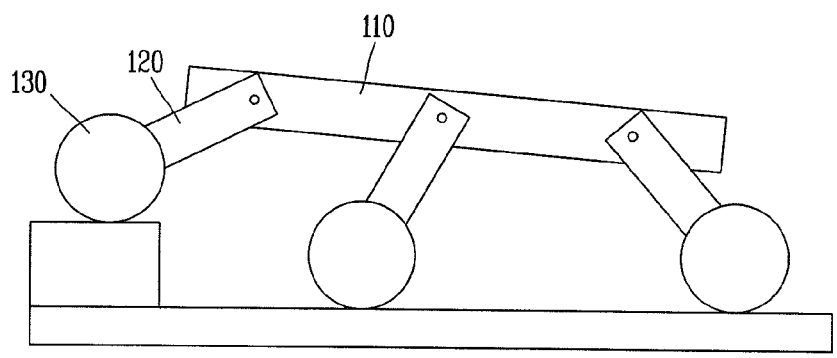
FIG. 2 is a side view of the wheel drive vehicle shown in FIG. 1.

FIG. 1 is a perspective view of a wheel drive vehicle in accordance with one exemplary embodiment, and FIG. 2 is a side view of the wheel drive vehicle shown in FIG. 1.

A wheel drive vehicle in accordance with one exemplary embodiment may include a main body 110 having an arm 120, and a wheel 130 rotatably connected to the arm 120.

Both side surfaces of the main body 110 is shown having a plurality of arms 120 rotatably connected thereto. This exemplary embodiment illustrates that total six arms 120 are connected to the both side surfaces by three for each surface. However, the number of arms 120 may differ according to designs thereof.

The wheels 130 may be rotatably connected to the arms 120, respectively. Namely, one end of the arm 120 is rotatably connected to the main body 110 and another end of the arm 120 is rotatably connected to the wheel 130.

The main body 110 may be provided with arm driving units 121 for rotating the arms 120, respectively. A wheel driving unit 145 (see FIG. 4) for rotating the corresponding wheel 130 may be installed within each wheel 130. The arm driving unit 121 and the wheel driving unit 145 may be implemented in the form of a driving motor, and be controllable to be independently operable.

As the arms 120 are rotated with respect to the main body 110, the main body 110 may be moved up and down, which allows the wheel drive vehicle to pass over obstacles.

FIG. 2 exemplarily shows that the main body 110 passes over an obstacle responsive to the rotation of the arms 120.

A topography detector installed in the main body 110 may estimate a height of an obstacle, a distance up to the obstacle and the like. Referring to FIG. 2, in order to pass over an obstacle perpendicularly protruded at the front, a rotation operation is performed to lift the arms 120 mounted at the front of the main body 110.

Here, considering sensing errors or the like, the front arms 120 may be listed higher than the estimated height of the obstacle derived from the measurements of the topography detector, and the main body 110 may be allowed to be moved forward by the estimated distance.

Afterwards, the front arms 120 may be taken down in a direction that the obstacle is located so as to render the front wheels 130 come in contact with the obstacle. When the front wheels 130 contact the obstacle, the next sequence of arm attitude control may be performed for overcoming the obstacle.

Thus, detecting whether or not the wheels 130 are in a contact state with the ground is an important part in control of traveling of the wheel drive vehicle. Hereinafter, description will be given in detail of a structure of a sensing unit for sensing contact or non-contact of the wheel 130 and a sensing method thereof, which are applied to the present disclosure.

Figure 3:
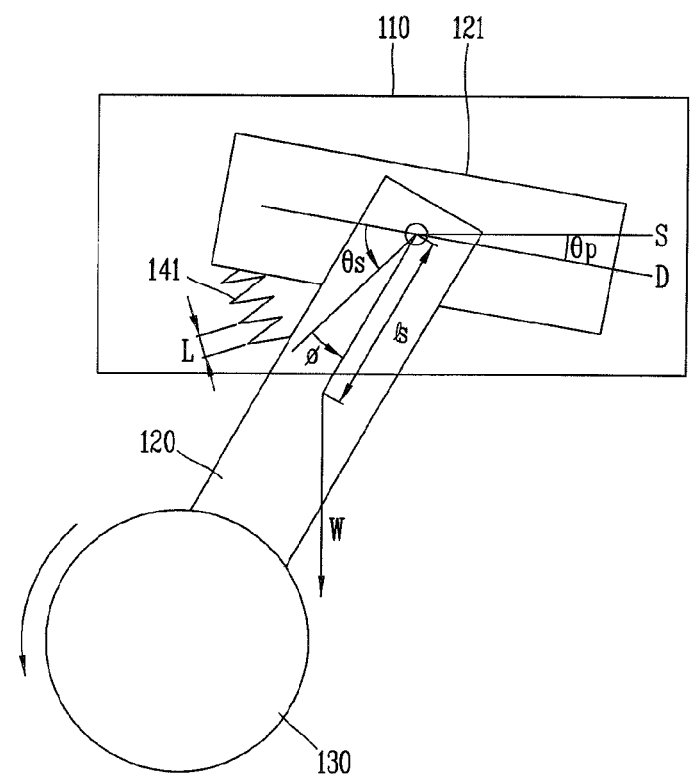
FIG. 3 is a view showing a structure of a sensing unit in accordance with the one exemplary embodiment.
Figure 4:
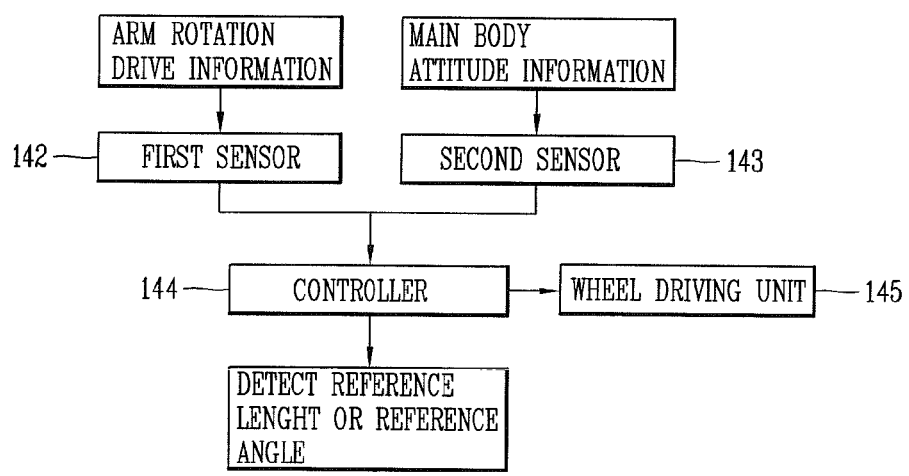
FIG. 4 is a block diagram of the sensing unit.

FIG. 3 is a view showing a structure of the sensing unit in accordance with the one exemplary embodiment, and FIG. 4 is a block diagram of the sensing unit.

Hereinafter, description will be made based upon one of the plurality of arms 120, but the structure of the sensing unit for sensing the wheel contact can be implemented in each arm, accordingly, whether the wheel is in the contact state or non-contact state can be sensed in each arm.

Referring to FIGS. 3 and 4, the sensing unit may include a spring 141 installed between the arm driving unit 121 of the main body 110 and the arm 120, a first sensor 142 for detecting rotation information related to the arm driving unit 121, a second sensor 143 for detecting attitude information related to the main body 110, and a controller 144 for detecting a non-contact state of the wheel 130 based upon those information detected by the first and second sensors 142 and 143 and the spring 141.

The arm 120 may be rotated by the arm driving unit 121 or by a contact force responsive to the wheel 130 contacting the exterior (for example, a ground). Describing this specification, the rotation of the arm 120 by the arm driving unit 121 may be referred to as 'arm rotation drive' and the rotation of the arm 120 by the wheel contact force may be referred to as 'arm rotary motion'.

The spring 141 may have one end secured with an output shaft of the arm driving unit 121 and another end secured with the arm 120 so as to be extended or compressed responsive to the rotary motion of the arm 120. The spring 141 may be implemented as a type of coil spring, gas spring, torsion bar or the like, for example. This exemplary embodiment shows the spring 141 is implemented as a type of coil spring.

In FIG. 3, $\theta s$ denotes an initially mounted angle of the arm 120 to the output shaft of the arm driving unit 121. The first sensor 142 may sense (or detect) an angle of the arm 120 being rotated from the initially mounted angle upon rotation of the arm driving unit 121, namely, an output shaft rotation angle of the arm driving unit 121. The first sensor 142 may be implemented as an angular sensor (for example, a resolver of an arm driving motor) of the arm driving unit 121.

The second sensor 143 may detect attitude information related to the main body 110, especially, a pitch angle that the main body 110 forms with respect to the ground. The pitch angle may be generated as the main body 110 is inclined from the ground when the arms 120 are rotated. The second sensor 143 may be implemented as an attitude sensor mounted to the main body 110.

The controller 144 may detect a reference length L of the spring 141 in a non-contact state from at least one of the rotation information related to the arm driving unit 121 and the attitude information, and detect a non-contact state of the wheel 130 based upon the measured length of the spring 141 and the detected reference length L.

Meanwhile, in addition to this method, the controller 140 may alternatively detect the reference angle Φ, which the spring has, in the non-contact state from at least one of the rotation information related to the arm driving unit 121 and the attitude information, and detect the non-contact state of the wheel 130 based upon a rotary motion angle and the reference angle Φ of the arm 120.

That is, the controller 140 may detect the non-contact state of the wheel 130 based upon the reference length L of the spring 141 and the length measured upon the spring 141 being transformed, or based upon the reference angle Φ of the arm 120 and the rotation angle measured upon the arm 120 being rotated.

The controller 140 may employ one of the two methods or combination of the two methods.

The following equations express the method of detecting the reference angle Φ and the reference length L based upon FIG. 3.

$$W_r = W \times l_s \times \cos(\theta_s + \theta_p)$$

$$\phi = \frac{W_r}{K_r}$$

$$L = \frac{W_l}{K_l}$$

In those equations, W denotes a weight of the arm 120 and the wheel 130, and $l_S$ denotes a distance between a rotation center of the arm 120 and the center of gravity between the arm 120 and the wheel 130.

$\theta_S$ denotes an initially mounted angle of the arm 120 with respect to the output shaft of the arm driving unit 121, and $\theta_P$ denotes a rotation angle of a mounting surface D of the output shaft of the arm driving unit 121 with respect to a horizontal surface S horizontal with the ground. Here, $\theta_P$ may be generated by a pitch angle of the main body 110 in response to inclination of the main body 110 or generated as the arm 120 is rotated with respect to the main body 110.

Kr denotes a rotation spring constant, $W_l$ denotes a weight applied to a mounted point of a linear spring by $W_r$, and $K_l$ denotes a linear spring constant.

Referring to the above equations, the reference angle Φ and the reference length L may be decided based upon the weight of the arm 120 and the wheel 130, a physical property of the spring 141 and the like. In addition, it can be found that the weight Wr deciding the reference angle Φ and the reference length L may differ due to $\theta_P$. Also, the weight $W_r$ can be decided by the pitch angle of the main body 110 and the rotation angle of the arm driving unit 121.

The first and second sensors 142 and 143 of the sensing unit may sense the rotation angle of the arm driving unit 121 and the pitch angle of the main body 110, respectively, so as to allow the controller 144 to detect the reference angle Φ or the reference length L.

Figure 5:
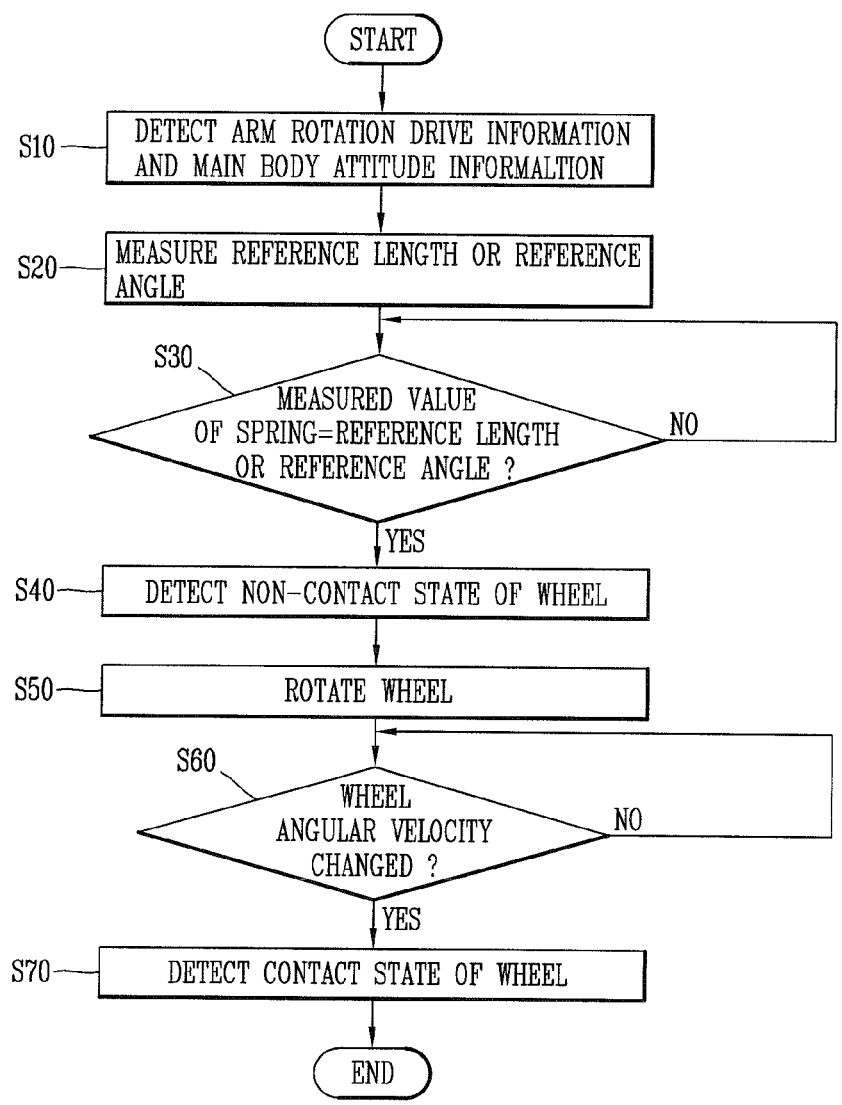
FIG. 5 is a flowchart showing a wheel contact sensing method in accordance with one exemplary embodiment.

FIG. 5 is a flowchart showing a wheel contact sensing method in accordance with one exemplary embodiment.

First, the first and second sensors 142 and 143 may detect rotation information related to the arm driving unit 121 and attitude information related to the main body 110, respectively (S10). The controller 144 may measure a reference length L of the spring 141 or a reference angle Φ of the arm 120 according to those equations (S20).

Those processes may be performed in real time during traveling of the wheel drive vehicle. The controller 144 may compare the measured length of the spring 141, which is changed in shape upon rotation of the arm 120, with the reference length L thereof, or compare an angle measured with respect to the rotary motion of the arm 120 with the reference angle Φ (S30).

When the measurement value is within an error range of the reference length L or the reference angle Φ, the controller 144 may consider it as the wheel 130 being in a non-contact state (S40).

In the meantime, in order to detect that the wheel 130 in the non-contact state is changed to a contact state with the ground, the controller 144 runs the wheel driving unit 145 for rotating the wheel 130 (S50). Here, the wheel driving unit 145 may rotate the wheel 130 with power as less as being able to rotate the wheel 130.

When the wheel 130 in the non-contact state is turned to the contact state with the ground, a angular velocity (rotational velocity) of the wheel 130 may change. Thus, when the change in the angular velocity of the wheel 130 is generated (S60), the controller 144 may recognize it as the wheel 130 being in contact state (S70).

The wheel contact sensing structure and method may have the following effects.

In general, a method of checking the contact of the wheel using a slip ratio, as a relation between the angular velocity of the wheel and the velocity of a vehicle, may be used as the wheel contact sensing method. However, if the location of the wheel is controlled by driving the arm in a stopped state of the vehicle, the method may be difficult in use because the location of the vehicle may change upon generating the velocity of the wheel (i.e., rotating the wheel) in the stopped state of the vehicle.

Consequently, the above problem has been overcome by sensing the non-contact state of the wheel 130 using the change in the length of the spring 141 or the change in the angle thereof in consideration of the attitude of the vehicle and the rotation angle of the arm 120, applying minimum power only to the detected wheel 130, and determining the contact using the change in the angular velocity of the wheel 130 when being contacted by the ground.

Figure 6:
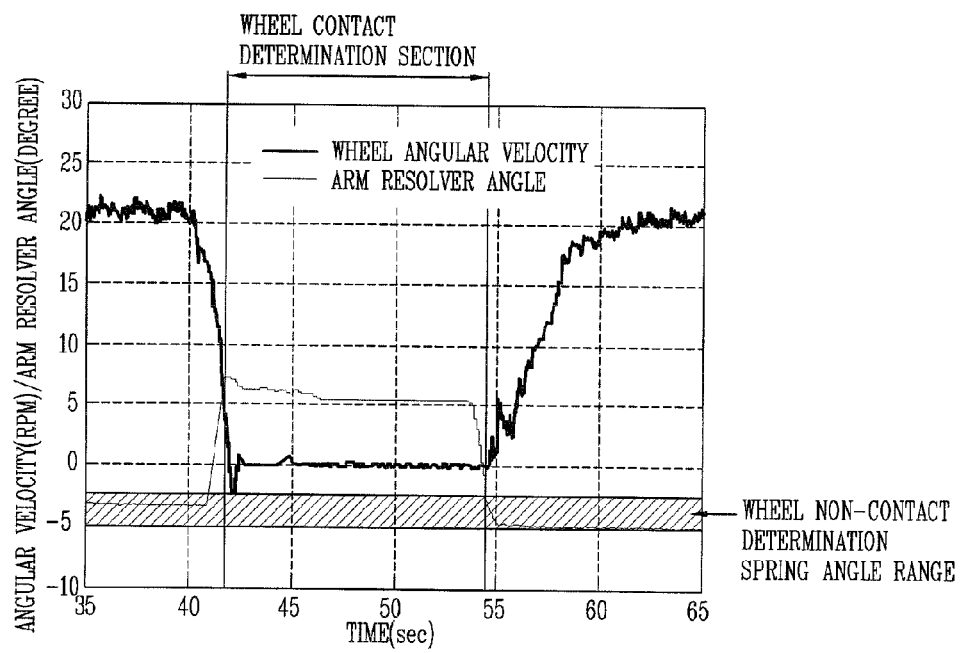
FIG. 6 is a graph showing measurements of a rotation angle of an arm and an angular velocity of a wheel during driving of the vehicle shown in FIG. 2.

FIG. 6 is a graph showing measurements of an arm resolver angle (arm rotation angle) and a wheel angular velocity (wheel rotational velocity) during driving of the vehicle shown in FIG. 2.

If the front arm 120 is lifted above the ground for passing over an obstacle, the spring 141 (rotation spring) installed at the front arm 120 is drawn down in a direction toward the ground (i.e., − direction), which is caused due to the gravity by the attitude of the main body 110 and the angle of the arm 120. During this process, the controller 144 detects that the wheel 130 is in the non-contact state. For reference, in this experimental example, the spring 141 has been implemented as a rotatable type, for example, a torsion bar, a torsion spring and the like.

Upon detecting the non-contact state of the wheel 130, the controller 144 may apply a command to the wheel driving unit 145 to rotate the wheel 130, and the wheel 130 may be rotated with the minimum power.

Afterwards, when a contact between the wheel 130 and the ground is detected as the front arm 120 is moved down, the angular velocity of the wheel 130 may change. The graph exemplarily shows that the wheel 130 is in a stopped state after being rotated. Here, the rotation spring 141 may have a rotation angle in an opposite direction (i.e., + direction) to the ground.

Also, if the arm 120 is rotated in the opposite direction to the ground for changing the attitude of the vehicle, the rotation spring 141 may have a rotation angle in a minus direction (i.e., − direction). When the rotation angle of the rotation spring 141 is within the range of the reference angle Φ, the controller 144 may detect the non-contact state of the wheel 130 and run the wheel driving unit 145.

As such, FIG. 6 shows the changes in the angle of the spring 141 and the angular velocity of the wheel 130 in case where the wheel 130 is sequentially changed in the order of non-contact state-contact state-non-contact state with respect to the ground.

Figure 7:
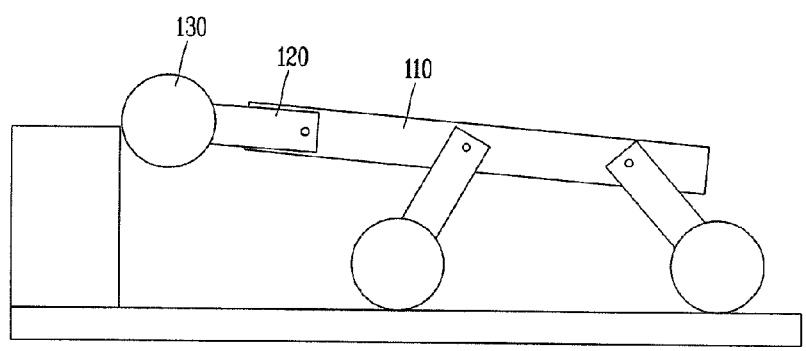
FIG. 7 is a view showing a wheel contact sensing method in accordance with another exemplary embodiment.

FIG. 7 is a view showing a wheel contact sensing method in accordance with another exemplary embodiment.

This exemplary embodiment shows an operation of a sensing unit in a state, which may occur due to measurement errors of the sensors upon driving the wheel drive vehicle in front of an obstacle.

A case may occur in which a height of an obstacle is erroneously measured due to the measurement error of the sensors or unevenness of the ground. In this case, at the step in which the wheel 130 runs by an estimated distance in a state of the front arm 120 being lifted, the front wheel 130 contacts the obstacle.

Here, a force generated by the contact between the wheel 130 and the obstacle may apply in a lengthwise direction of the arm 120, so a change in the length of the spring 141 may rarely occur. Here, the velocity of the wheel 130 being rotated may change.

Using these characteristics, the controller 144 may detect a sensing accuracy with respect to the height of the obstacle, namely, whether or not the height of the obstacle has been accurately estimated. That is, if the contact between the wheel 130 and the obstacle is detected (sensed) prior to reaching the estimated distance, the controller 144 may determine there is a problem in the step of listing the front arm 120, namely, estimating the height of the obstacle. Accordingly, the wheel contact sensing can be supported in various directions as well as the ground, thereby determining an error in the control procedure.

The foregoing description has been given of the wheel drive vehicle and the wheel contact sensing method thereof with reference to the accompanying drawings. However, the present disclosure may be modified in various manners within the scope of the present disclosure without being limited to the embodiments and drawings disclosed in the specification.

INDUSTRIAL APPLICABILITY

The wheel drive vehicle and the wheel contact sensing method thereof may be industrially applicable.

The invention claimed is:

1. A wheel drive vehicle comprising a main body having a rotatable arm and an arm driving unit for driving the arm, a wheel rotatably mounted to the arm, and a sensing unit for sensing a non-contact state of the wheel from a ground,
   wherein the sensing unit comprises:
   a spring installed between the arm driving unit and the arm, and extended or compressed in response to a relative rotary motion of the arm with respect to an output shaft of the arm driving unit;
   first and second sensors configured to detect rotation drive information related to the arm with respect to the main body and attitude information related to the main body; and
   a controller configured to measure a reference length of the spring or a reference angle of the arm in the non-contact state based upon at least one of the rotation drive information related to the arm and the attitude information related to the main body, and detect the non-contact state of the wheel based upon the measured length of the spring and the reference length thereof or based upon a rotary motion angle of the arm and the reference angle thereof.

2. The vehicle of claim 1, wherein the arm is provided in plurality at the main body to be independently driven,
   wherein the sensing unit is provided at each of the plurality of arms.

3. The vehicle of claim 1, wherein the spring is one of a coil spring, a gas spring and a torsion bar.

4. The vehicle of claim 1, wherein the rotation drive information related to the arm comprises an output shaft rotation angle of the arm driving unit.

5. The vehicle of claim 1, wherein the first sensor is an angular sensor of the arm driving unit and the second sensor is an attitude sensor mounted to the main body.

6. The vehicle of claim 1, wherein a wheel driving unit for rotating the wheel is provided within each wheel, and
   wherein the controller runs the wheel driving unit to rotate the wheel in the non-contact state.

7. The vehicle of claim 6, wherein the controller detects a contact state between the wheel and the ground from a velocity change of the wheel, generated in response to the wheel contacting the ground.

8. The vehicle of claim 6, wherein the wheel driving unit rotates the wheel with power as less as being able to rotate the wheel.

9. A wheel contact sensing method for a wheel drive vehicle, in a wheel contact sensing method for sensing a non-contact state between a wheel and a ground using a spring connected between an arm driving unit and an arm and first and second sensors during running of the wheel drive vehicle, the vehicle comprising a main body having the rotatable arm and the arm driving unit for driving the arm, and the wheel rotatably mounted to the arm, the method comprising:
   detecting rotation drive information related to the arm and attitude information related to the main body by the first and second sensors;
   measuring a reference length of the spring or a reference angle of the arm in the non-contact state based upon at least one of the rotation drive information related to the arm and the attitude information related to the main body; and
   measuring a length of the spring to detect the non-contact state of the wheel based upon the measured length of the spring and the reference length thereof or measuring a rotary motion angle of the arm to detect the non-contact state of the wheel based upon the measured angle of the arm and the reference angle thereof.

10. The method of claim 9, wherein the rotation drive information related to the arm comprises an output shaft rotation angle of the arm driving unit.

11. The method of claim 9, wherein the reference length is detected based upon a weight of the arm and the wheel and a physical property of the spring.

12. The method of claim 9, wherein the reference angle is detected based upon a weight of the arm and the wheel and a physical property of the spring.

13. The method of claim 9, further comprising:
   rotating the wheel in the non-contact state of the wheel; and
   detecting a contact state between the wheel and the ground based upon a velocity change of the wheel, generated in response to the wheel contacting the ground.

14. The method of claim 9, further comprising:
   sensing a height of an obstacle located at the front of the main body;
   rotating the wheel in the non-contact state of the wheel; and
   detecting accuracy of the sensed result from a velocity change of the wheel, generated in response to the wheel contacting the obstacle.

* * * * *